(12) United States Patent
Goodson et al.

(10) Patent No.: US 8,731,516 B2
(45) Date of Patent: May 20, 2014

(54) TEXT MESSAGING 911 CALLS

(75) Inventors: Heather Lynne Goodson, Lafayette, CA (US); Susan Jane Sherwood, Roswell, CA (US); Thaddeus Jude Dudziak, Pleasanton, CA (US)

(73) Assignee: Cellco Partnership, Basking Ridge, NJ (US)

( * ) Notice: Subject to any disclaimer, the term of this patent is extended or adjusted under 35 U.S.C. 154(b) by 87 days.

(21) Appl. No.: 13/341,494

(22) Filed: Dec. 30, 2011

(65) Prior Publication Data
US 2013/0171958 A1 Jul. 4, 2013

(51) Int. Cl.
*H04W 88/02* (2009.01)
(52) U.S. Cl.
USPC ....................................................... 455/404.2
(58) Field of Classification Search
USPC ..................................................... 455/404.2
See application file for complete search history.

(56) References Cited

U.S. PATENT DOCUMENTS

| | | | |
|---|---|---|---|
| 7,561,873 B2 | 7/2009 | Angelopoulos et al. | |
| 2004/0176123 A1* | 9/2004 | Chin et al. | 455/521 |
| 2011/0009086 A1* | 1/2011 | Poremba et al. | 455/404.1 |

* cited by examiner

*Primary Examiner* — Diane Mizrah

(57) ABSTRACT

An emergency message handling system manages emergency SMS text messages sent by mobile stations. The system also includes an emergency handling platform comprising an SMS gateway server, an SMS application server, and an SMS-To TTY message converter. In response to an emergency SMS text message received via a mobile communication network, the emergency handling platform determines the location of the mobile station and identifies the Public Safety Answering Point (PSAP) assigned to cover the location of the mobile station. If the PSAP assigned is only TTY compatible, the text message is converted to TTY. A TTY selective router is configured to deliver each of converted emergency SMS text message in TTY format to the TTY messaging system of the TTY PSAP. However, if the PSAP assigned is IP network compatible, then the text message is delivered directly to the IP compatible PSAP without any TTY conversions.

18 Claims, 5 Drawing Sheets

Call Flow: User Out of Service Area

Call Flow Using Direct IP PSAP

Call Flow Using Legacy TTY PSAP

Call Flow: Location Request Fails

Call Flow: User Out of Service Area

US 8,731,516 B2

TEXT MESSAGING 911 CALLS

BACKGROUND

Mobile stations, such as cell phones, are sometimes used to communicate with emergency call services, such as Public Safety Answering Points (PSAPs) via a 911 call. Some callers, however, may be unable or unwilling to communicate verbally with the emergency call service. Such callers, for example, may be disabled and unable to speak. Other callers may be subject to conditions which may make speaking unsafe, such as being in the midst of a kidnapping or a robbery. Other users may not have enough time to deal with the delays which sometimes occur when placing a voice call to 911, such as delays caused by network congestion, dropped calls, and/or having to wait for a 911 operator. Still other users may be timid about the prospect of their voice call being recorded by 911, such as bystanders who might otherwise summon help. Still other users may be hearing-impaired and have difficulty or be unable to verbally communicate.

Modern portable phones include features such as text messaging, e-mail, instant messages, and video chat, which are quite widely used, in many cases, instead of voice calls. These features also provide effective and popular ways for the hearing/speaking-impaired to communicate with others. However, during emergencies, these wireless devices do not always provide adequate access to the emergency 911 system.

The current 911 emergency call system for the hearing-impaired generally requires the use of a teletype (TTY) text telephone device to contact 911 in an emergency. TTY devices are relatively large and bulky—typically the size of a laptop computer. Due to the form factor, it is understandable that TTY devices are less desirable than a portable phone. Moreover, it is unlikely that a hearing impaired user would carry multiple mini-QWERTY style devices in anticipation of an emergency.

Although the relatively few existing IP-capable 911 Public Safety Answering Points (PSAPs) have the capability to accept text-based communications, the only carrier-supported offering is through the use of 5 digit SMS short codes which may lack important features, such as information about the location of the call.

BRIEF DESCRIPTION OF THE DRAWINGS

The drawings illustrate illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Figure 1:
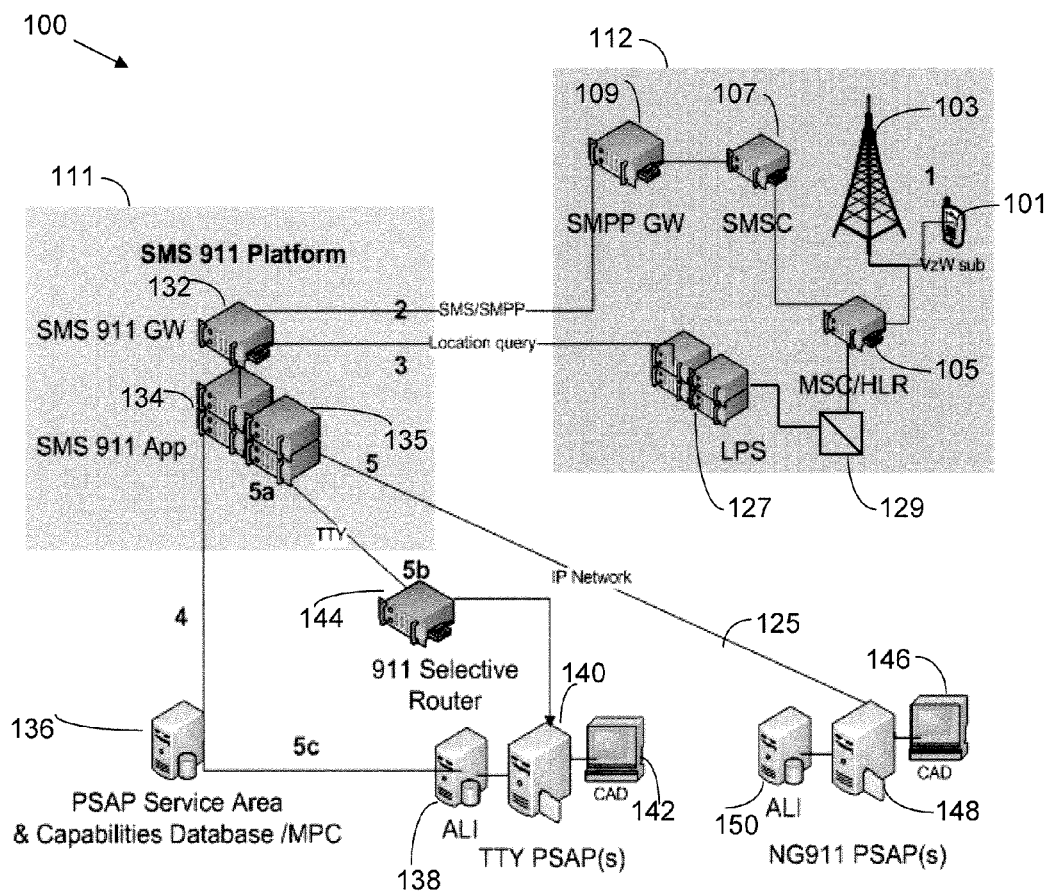
FIG. 1 is an example of a mobile communication network communication system which includes an emergency message handling system.

Reference now is made in detail to the examples illustrated in the accompanying drawings and discussed below. FIG. 1 is an example of a mobile communication network communication system 100 which includes an emergency message handling system. At a high-level, the overall system 100 includes a mobile network 112 providing a wide array of mobile communication services to users of mobile stations, an emergency handling platform (also referred to as Emergency Handling Platform) 111, a database 136, a number of different PSAPs 138 and 150 and elements such as a router 144 to deliver traffic to the PSAPs. The PSAPs typically are operated by or for one or more public agencies, although most if not all of the other elements of the system 100 may be operated by the carrier or service provider that provides the mobile communication services to users of mobile stations via the network 112.

The mobile communication network communication system 100 may include or service one or more mobile stations, such as the cell phone 101 shown by way of an example in the drawing. The cell phone may be a smartphone or a feature phone, depending on the preference of the user. Other types of mobile stations may be used in addition or instead of cell phones, such as telematics devices, net-books personal computers, and tablet devices.

For purposes of the present discussion, each mobile station is configured to send and receive text messages, such as Short Message Service (SMS) text messages, although the mobile station may have other messaging and/or data communication capabilities. Each mobile station is configured to address each outgoing SMS text message to a number entered into the mobile station. For most text messages, the destination number is a telephone number, although for some services the number is a short code. For an emergency service communication, the destination number is a designated telephone number, for example, in the US, typically 911. Sending an emergency SMS text message therefore includes, for example, receiving an outgoing emergency SMS text message from a user and addressing the outgoing emergency SMS text message to the emergency call service telephone number 911. Each mobile station is also configured to receive outgoing SMS text messages and to address them to non-emergency destinations, such as to friends and business contacts, using telephone numbers.

For example, the mobile network 112 part of the communication system 100 includes base stations 103 distributed geographically. The mobile network 112 is configured to cause a communication link to be established between each communicating mobile station 101 and a nearby base station 103. The link can carry voice traffic over a voice channel and/or over an Internet Protocol (IP) data channel. Text messaging may involve SMS communication over a signaling channel of the air-link or IP text communication.

For purposes of the SMS communications, a home location register (HLR) 105 stores for each mobile station 101 registered therewith the subscriber's mobile directory number (MDN), the mobile identification number (MIN), and information specifying the wireless services subscribed to by the mobile subscriber, such as voice service features, SMS, mobile web access, etc. As will be discussed below, one aspect of normal HLR processing of an incoming SMS call involves translation of the MDN associated with the call into the MIN, for use in completing the call to the mobile station 101. For each mobile station 101, the HLR 105 also stores data identifying the current point of attachment of the mobile station 101 to the network. The HLR 105 also acts as a message service center (MSC) that routes the voice traffic and text messages to and from the base station 103. In a network of the type shown, the information identifies the MSC 105 at which the mobile station 21 most recently registered. The network uses the MSC 105 address information to route the SMS call through to the mobile station 21 at its current location.

The SMS traffic normally goes to/from a Short Message Service Center (SMSC) 107. The SMSC 107 stores and forwards all messages. For example, the SMSC 107 communicates with external equipment, including the emergency handling platform 111. To provide the interface for such communications, the network 112 includes a Short Message Peer-to-Peer (SMPP) gateway server 109. The SMPP gateway server 109 communicates with the SMSC 107 via an internal IP link or network, and communicates with the SMS gateway server (also referred to as SMS 911 Gateway) 132 of the emergency handling platform 111. The SMPP gateway server 109 allows the SMSC 107 to receive and send messages. The SMPP gateway server 109 is an entity within the wireless network 112 that acts as an intermediary between the wireless service provider network and the external application server network (i.e., emergency handling platform 111). The SMPP messages ride on IP transport, e.g., between the SMPP gateway server 109 and the SMSC 107.

In the example of FIG. 1, the Emergency Handling Platform 111 includes the SMS gateway server 132 and an SMS 911 Application server 134.

In one example, the SMS gateway server 132 of the emergency platform 111 is configured to receive the emergency SMS text messages from the SMPP gateways, such as from SMPP gateway server 109. The SMS gateway server 132 is also configured to receive non-emergency SMS text messages from the same gateway as well as other gateways.

The SMS 911 Application server 134 of the platform 111 is configured to determine whether an emergency text message should be directed to a legacy TTY PSAP or to a new IP network PSAP. In one example, the Emergency Handling Platform 111 includes an SMS-to-TTY message converter 135 which is configured to convert each of the emergency SMS text messages into TTY format to communicate with a TTY PSAP 140. Further, the SMS-to-TTY message converter 135 is configured to convert from TTY to SMS text message format in order to communicate the messages from the TTY PSAP 140 back to the mobile station 101.

The Emergency Handling Platform 111 is further configured to determine which of several emergency call services is closest to the mobile station which sent the emergency SMS text message. In this regard, the Emergency Handling Platform 111 connects to the PSAP assigned to cover the location of the mobile station 101, to deliver the emergency SMS text message. For example, if the PSAP network assigned to cover the location of the mobile station 101 is the modern IP network type, then the Emergency Handling Platform 111 routes the SMS text message directly to the IP compatible PSAP (e.g., 148). However, if the assigned PSAP is determined to be a legacy TTY PSAP, the text message is converted into TTY format and routed to the TTY PSAP (e.g., 140). The Emergency Handling Platform 111 is configured to route the emergency message to the PSAP assigned to cover the location of the mobile station 101 by obtaining the physical geographic address of the mobile communication from a location platform server (LPS), such as LPS 127.

In one example, the LPS 127 is configured to seek the location information from the MSC/HLR 105, communicating through a switch, such as a switch 129. The MSC/HLR 105 provides the location information in response. The degree of accuracy in the location information may vary. For example, the location information may be coarse and based only on the location of the base station with which the mobile station has established a communication link, such as the location of the base station 103. For a more precise longitude and latitude, the MSC/HLR 105 may be configured to communicate with the mobile station and seek its location based on a GPS receiver which may be contained within the mobile station, based on triangulation technology, and/or based on other technology. Considerations other than distance may also be factored in the selection of the emergency call service by the Emergency Handling Platform 111.

In one example, to the extent that the PSAP assigned to cover the location of the mobile station 101 is only legacy TTY compatible, the SMS 911 Application server 134 sends the message to the SMS-to-TTY message converter 135. Thereafter, the TTY encoded message is sent to a selective router, such as 911 Selective Router 144. The selective router may be configured to route the TTY traffic to the emergency call service that covers the region in which the mobile station is present. Thereafter, the selective router may be configured to establish a communication link with TTY equipment at the emergency call service, such as TTY equipment 138, 140, and 142.

In one example, an operator at the emergency call service center, queries an automatic location identification (ALI) system 138, seeking information about the location of the mobile station that sent the emergency SMS text message. The ALI system 138, in turn, communicates through a PSAP Service Area & Capabilities Database/Mobile Positioning Center (PSAP DB/MPC) 136, to query the Emergency Handling Platform 111 for this location information. In this regard, the SMS 911 Application server 134 is configured to provide the location information through the SMS gateway server 132, by communicating with the LPS 127.

The PSAP DB/MPC 136 may be in one of the computers of the Emergency Handling Platform 111 or on a separate computer in communication with the SMS 911 Application server 134. This layout may be determined, for example, based on the number of PSAP (amount of data in the DB) and/or the expected volume of emergency text message traffic.

The legacy TTY PSAP 140 is configured to respond to a received emergency SMS text message by using, for example, the same TTY equipment (i.e., TTY PSAP 140, 911 Selective Router 144, and SMS to TTY message converter 135). For example, the PSAP 140 sends a reply emergency text message in TTY format. This reply TTY message is routed through the 911 Selective Router 144, and the SMS to TTY message converter 135. After this point, the connection to the mobile station 101 may be the same as the route from an IP Network PSAP. For example, the SMS 911 Application server 134 routes the reply message to the SMS gateway server 132 of the Emergency Handling Platform 111. Subsequently, the message is routed to the mobile communication network.

In this regard, the SMPP gateway server 109 is configured to deliver the converted emergency TTY text message to an SMSC, such as to the SMSC 107. In turn, the SMSC 107 is configured to deliver the converted emergency TTY text message to an MSC/HLR, such as the MSC/HLR 105. In turn, the MSC/HLR 105 is configured to deliver the converted emergency TTY text message to a base station, such as to the base station 103. In turn, the base station 103 is configured to deliver the converted emergency text message to the mobile station 101 from which the converted emergency TTY text message was sent.

Figure 2:
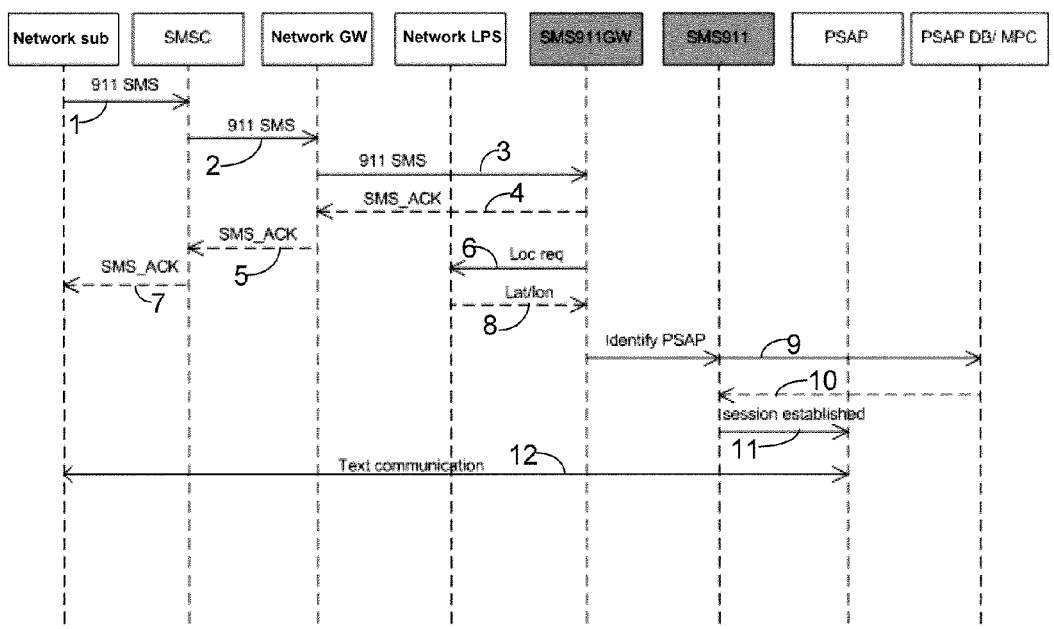
FIG. 2 is an example of a high level call flow illustrating an SMS 911 Session with a PSAP that is compatible with an IP network.

It may be helpful now to consider some examples of the steps involved in placing an emergency call through text messaging. FIG. 2 is an exemplary high level call flow illustrating an SMS 911 Session with a PSAP that is compatible with an IP network (i.e., does not require TTY translation). In step 1, a wireless mobile station sends a text message to 9-1-1 (e.g., "Help!"). This message is received by a base station of a mobile communication network and routed to a short message service center (SMSC) via mobile station controller (MSC)/home location register (HLR).

In step 2, the text message is delivered to an SMPP gateway of the mobile communication network. This gateway is configured to deliver the SMS text message to an emergency message handling platform. However, at this point, it is still not determined whether the SMS text message needs to be translated into a TTY compatible form.

In step 3, the SMS emergency message is routed to the Emergency Handling Platform. In particular, the message is sent to the SMS gateway server. Next, (in step 4), the SMS gateway server sends an acknowledgment signal to the SMPP gateway server, indicating that the Emergency Handling Platform has received the emergency message.

In step 5, the SMPP gateway server relays this acknowledgment to the SMSC. Next, this acknowledgment is sent all the way to the mobile station that originated the emergency text message (i.e., step 7). The feedback to the subscriber is the text message from the PSAP in response to the initial message that was sent by the subscriber. From this message the Emergency Handling Platform can find out if the subscriber received their message. However, the service will make use of the SMPP Delivery Receipt to determine if the message reached the mobile station.

Steps 6 and 8 have been placed out of sequence with respect to steps 5 and 7. That is because they can occur concurrently, before, or after steps 5 and 7. In step 6, the SMS gateway server queries a location platform server (LPS) for the location of the mobile station that originated the emergency text message.

In step 8, the LPS determines the location information from the MSC/HLR and provides this information to the SMS gateway server. As discussed before, the degree of accuracy in the location information may vary. In one example, the determination may be coarse (e.g., based only on the location of the base station with which the mobile station has established a communication link). In another example, a more precise longitude and latitude may be provided by the mobile station based on the GPS receiver of the mobile station. In yet another example, base station triangulation technology, or any combination of the above described location methods may be used to determine the location of the mobile station.

In step 9, the Emergency Handling Platform attempts to determine the location of the nearest PSAP. In this regard, the SMS gateway server sends the request to the SMS 911 Application server. The SMS 911 Application server in turn contacts the PSAP Service Area & Capabilities Database/MPC (PSAP DB/MPC). The PSAP DB/MPC is configured to provide the location of the PSAP assigned to cover the location of the mobile station and determine whether the assigned PSAP is a legacy TTY type PSAP or the newer IP compatible PSAP.

In step 10 the PSAP DB/MPC provides the location and the PSAP type information to the SMS 911 Application server. The Emergency Handling Platform determines on a PSAP by PSAP basis whether the TTY solution or IP solution is appropriate in order to process the emergency message from the mobile station. In the example of FIG. 2, it is assumed that the nearest PSAP is IP network compatible.

Accordingly, in step 11, a session is established between the SMS 911 Application server and the IP network compatible PSAP. Notably, there is no translation requirement into TTY.

In step 12, there is SMS text communication between the wireless mobile station and the IP network compatible PSAP, without a requirement to translate the text message into a TTY compatible format.

Figure 3:
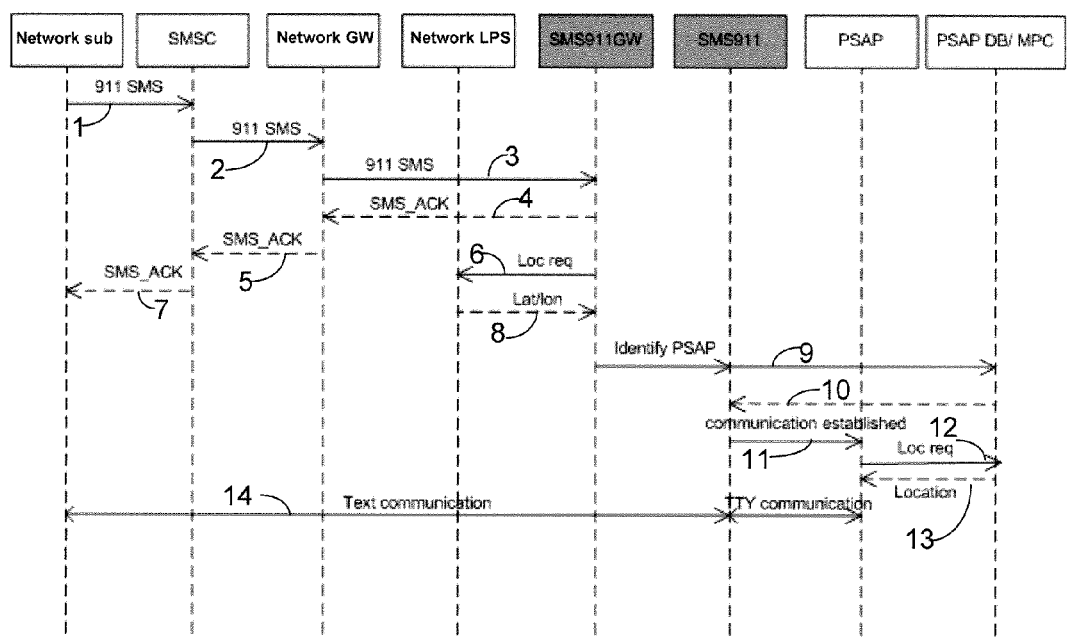
FIG. 3 is an example of a high level call flow illustrating an SMS 911 Session with a legacy TTY PSAP.

As discussed above, the emergency handling system is also capable of accommodating the legacy TTY PSAP emergency systems. In this regard, FIG. 3 provides an example of a high level call flow illustrating an SMS 911 session with a legacy TTY PSAP (i.e., requires TTY translation). In one example, steps 1 to 9 are substantially similar to the steps discussion in the context of FIG. 2. Steps 1 to 9 are therefore not repeated for brevity.

In step 10 of FIG. 3, the PSAP DB/MPC provides the location of the PSAP assigned to cover the location of the mobile station and indicates whether the assigned PSAP is a legacy TTY type PSAP or the newer IP compatible PSAP. For the example of FIG. 3 it is assumed that the assigned PSAP is a legacy type TTY. This information is provided to the SMS 911 Application server.

In step 11, the Emergency Handling Platform determines on a PSAP by PSAP basis whether the TTY solution or IP solution is appropriate in order to process the emergency message from the mobile station. Since in the example of FIG. 3, the nearest PSAP is the legacy TTY interface, the text message is converted into a TTY compatible form. In this regard, an SMS-to-TTY message converter of the SMS 911 Application server is configured to convert each of the emergency SMS text messages into TTY format to communicate with a TTY PSAP. Accordingly, a session is established between the SMS 911 Application server and the TTY PSAP.

The communication from the SMS 911 Application server to the TTY PSAP does not include the location information of the mobile station. In step 12, a request to determine the location is sent from the TTY PSAP to the PSAP Service Area & Capabilities Database/MPC (PSAP DB/MPC). In one example this request is routed through an automatic location identification (ALI) system. The ALI system, in turn, communicates through a PSAP Service Area & Capabilities Database/MPC, to query the Emergency Handling Platform 111 for this location information. In this regard, the SMS 911 Application server is configured to provide the location information through the SMS gateway server 132, by communicating with the LPS.

In step 13, once the PSAP DB/MPC determines the location of the mobile station, the PSAP DB/MPC provides an identification of the location to the TTY PSAP.

In step 14, there is communication between the mobile station and the TTY PSAP through text messaging. Each emergency SMS text message from the mobile station to the TTY PSAP is translated by the Emergency Handling Platform. For example, an SMS-to-TTY message converter converts each of the emergency SMS text messages into TTY format to communicate with the TTY PSAP. Further, the SMS-to-TTY message converter converts from TTY to SMS text message format in order to communicate the messages from the TTY PSAP back to the mobile station.

Figure 4:
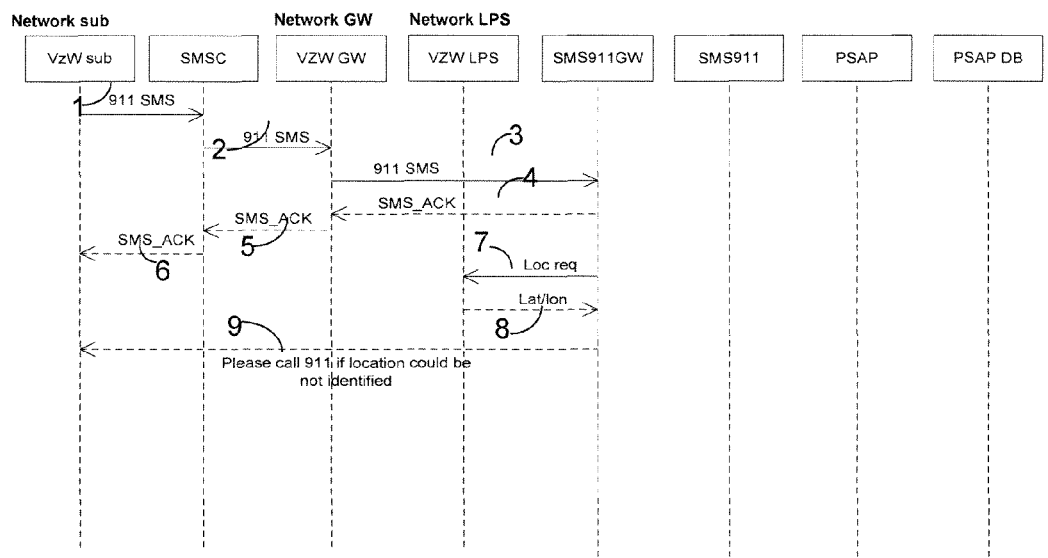
FIG. 4 is an example of a high level call flow illustrating an emergency text message wherein the location request fails.

FIG. 4 is an example of a high level call flow illustrating an emergency text message wherein the location request fails. In step 1, a wireless mobile station sends a text message to 9-1-1. This message is received by a base station of a mobile communication network and routed to a short message service center (SMSC) via mobile station controller (MSC)/home location register (HLR).

In step 2, the text message is delivered to an SMPP gateway server of the mobile communication network. This gateway is configured to deliver the SMS text message to an emergency message handling platform.

In step 3, the SMS emergency message is routed to the Emergency Handling Platform. For example, the message is sent to the SMS gateway server. Next, (in step 4), the SMS gateway server sends an acknowledgment signal to the SMPP gateway server, indicating that the Emergency Handling Platform has received the emergency message.

In step 5, the SMS gateway server relays this acknowledgment to the SMSC. Next, this acknowledgment is sent all the way to the mobile station that originated the emergency text message (i.e., step 6).

As provided in the context of the discussion of FIG. 1, steps 7 and 8 may occur concurrently, before, or after steps 5 and 6.

In step 7, the SMS gateway server queries a location platform server (LPS) for the location of the mobile station that originated the emergency text message.

In step 8, the LPS attempts to determine the location information from the MSC/HLR in a manner similar to that described above and provides this information to the SMS gateway server.

In step 9, the SMS gateway server sends an error message to the mobile station that originated the emergency message, indicating that the location could not be identified and that communication with the PSAP has therefore not been established (e.g., "Please call 911—your location cannot be determined").

Figure 5:
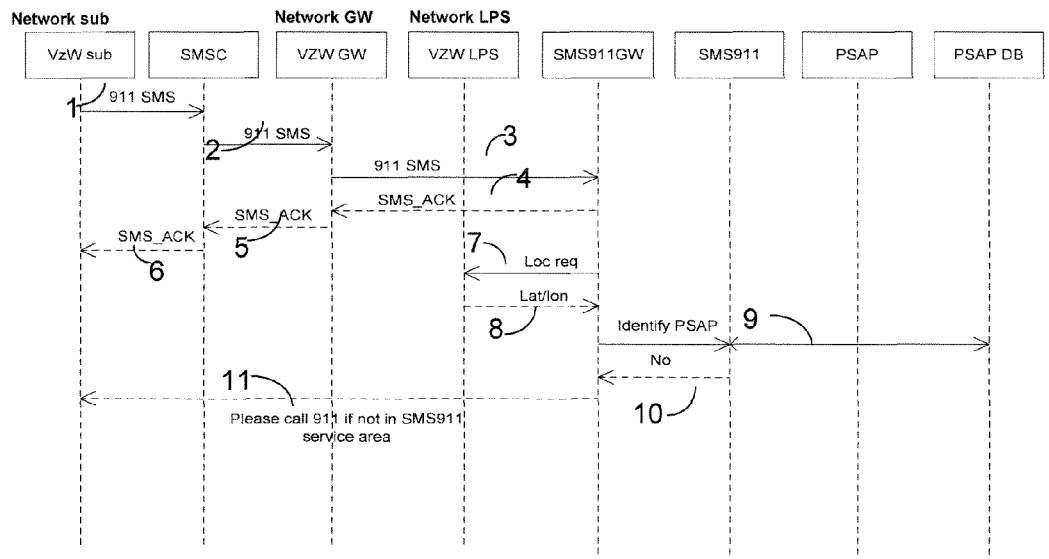
FIG. 5 is an example of a high level call flow illustrating handling of an emergency text message wherein the mobile station is out of the service area system.

FIG. 5 is another example of an unsuccessful attempt to reach a PSAP through text messaging. In particular, FIG. 5 illustrates an example of a high level call flow illustrating an emergency text message wherein the user of the mobile station is out of the service area.

Steps 1 to 7 of FIG. 5 are substantially similar to steps 1 to 7 discussed in the context of FIG. 4. Accordingly, the descriptions of steps 1 to 7 are not repeated here for brevity.

In step 8 of FIG. 5, the LPS determines the location information from the MSC/HLR and provides this information to the SMS gateway server. Next, in step 9, the Emergency Handling Platform attempts to determine the location of the nearest PSAP. In this regard, the SMS gateway server sends the request to the SMS 911 Application server. The SMS 911 Application server in turn contacts the PSAP Service Area & Capabilities Database/MPC (PSAP DB/MPC). The PSAP DB/MPC is configured to provide the location of the PSAP assigned to cover the location of the mobile station and determine whether the assigned PSAP is a legacy TTY type PSAP or the newer IP compatible PSAP. In the unusual circumstance in which the PSAP DB/MPC determines that the mobile station that originated the emergency text message is not within the range of any PSAP, this is communicated to SMS 911 Application server by the PSAP DB/MPC.

In step 10 the SMS 911 Application server notifies the SMS gateway server that there is no PSAP within range.

In step 11, the SMS gateway server sends a message to the mobile station that originated the emergency message, indicating that the caller is not in an emergency service area and that communication with the PSAP has therefore not been established (e.g., "Please call 911—you are not within an emergency service area").

Figure 6:
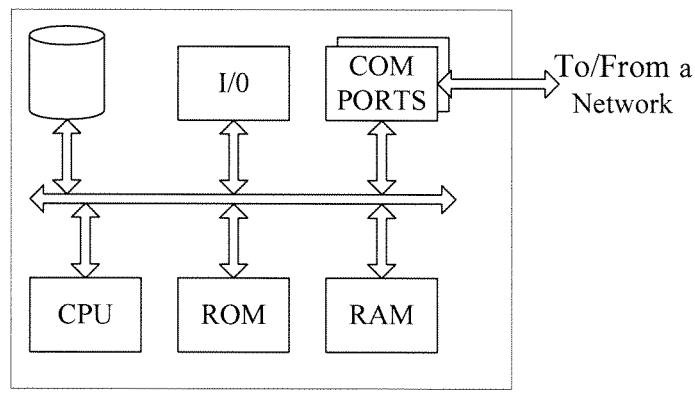
FIG. 6 illustrates a network or host computer.
Figure 7:
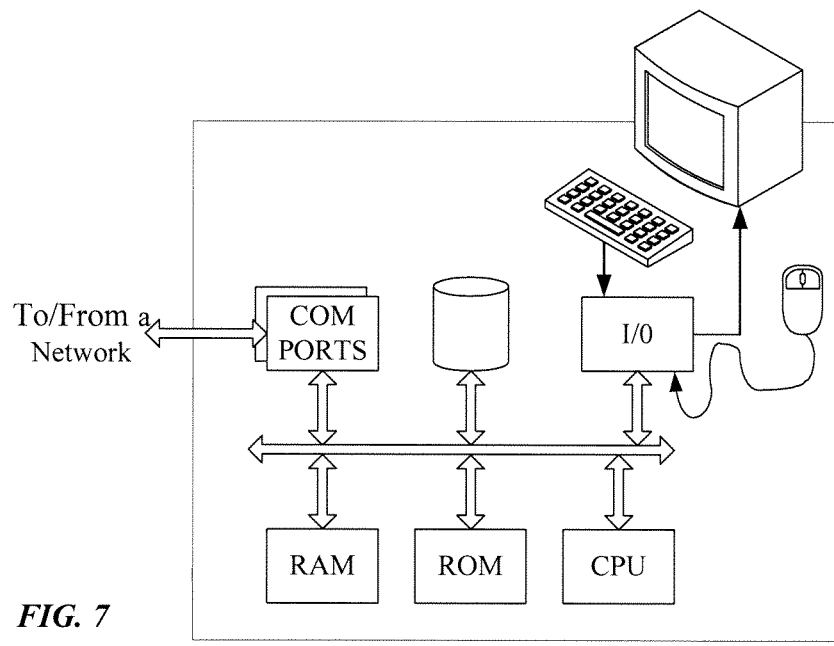
FIG. 7 depicts a computer with user interface elements.

A number of the elements of the system 100 may be implemented by special purpose hardware devices, but often such elements are implemented by appropriately programmed general purpose computers. FIGS. 6 and 7 provide functional block diagram illustrations of general purpose computer hardware. FIG. 6 illustrates a network or host computer, as may be used to implement a server such as the SMPP gateway server 109 and SMS gateway server 132, and application server 134 of system 100 of FIG. 1. FIG. 7 depicts a computer with user interface elements, as may be used to implement a personal computer or other type of workstation or terminal device, although the computer of FIG. 7 may also act as a server if appropriately programmed. For example, such computers can be used as the CAD terminals 142 and 146 of system 100 of FIG. 1. It is believed that the structure, programming, and general operation of such computer equipment is well known and as a result, the drawings should be self-explanatory.

As known in the data processing and communications arts, a general-purpose computer may include a central processor or other processing device, an internal communication bus, various types of memory or storage media (RAM, ROM, EEPROM, cache memory, disk drives, etc.) for code and data storage, and one or more network interface cards or ports for communication purposes. The software functionalities involve programming, including executable code as well as associated stored data and content relating to affiliated web sites. The software code is executable by the general-purpose computer that functions as the server and/or that functions as a client device. In operation, the code is stored within the general-purpose computer. At other times, however, the software may be stored at other locations and/or transported for loading into the appropriate general-purpose computer system. Execution of such code by a processor or central proceeding unit of the computer enables the implementation of the techniques described herein, in essentially the manner performed in the implementations discussed and illustrated herein.

A server, for example, includes a data communication interface for packet data communication. The server also includes a central processing unit (CPU), in the form of one or more processors, for executing program instructions. The server may include an internal communication bus, program storage, and data storage for various data files to be processed and/or communicated by the server, although the server often receives programming and data via network communications. The hardware elements, operating systems, and programming languages of such servers and client devices are conventional in nature, and it is presumed that those skilled in the art are adequately familiar therewith. Of course, the server functions may be implemented in a distributed fashion on a number of similar platforms, to distribute the processing load.

Hence, aspects of the present methods outlined above may be embodied in programming. For example, the SMPP gateway server 109 and the SMS gateway server 132 of system 100 of FIG. 1 are programmed to properly communicate with each other. Further, the application server 134 of the platform 111 is programmed to determine whether an emergency text message should be directed to a legacy TTY PSAP is or to a new IP network PSAP. The MSC, HLR and SMSC may be programmed to properly route the emergency text messages via the platform 111. Program aspects of the technology may be thought of as "products" or "articles of manufacture" and may be in the form of executable code and/or associated data that is carried on or embodied in a type of machine-readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible, non-transitory "storage" media, terms such as computer or machine "readable medium" refer to any medium that participates in providing instructions to a processor for execution.

Hence, a machine-readable medium may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the social network method, etc., shown in the drawings. Volatile storage media include dynamic memory, such as main memory of such a computer. Tangible transmission media include coaxial cables, copper wire, and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The described system thus permits emergency services to be provided in response to an emergency text message, for example to a hearing-impaired subscriber without the subscriber operating or carrying a separate TTY device to contact 911 in an emergency. Location information of the mobile device used is automatically obtained when an emergency text message is sent from the mobile device.

While the foregoing has described what are considered to be the best mode and/or other examples, various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It is intended that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX

Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

ALI—Automatic Location Identification
CD-ROM—Compact Disc Read Only Memory
CPU—Central Processing Unit
DVD—Digital Video Disc
DVD-ROM—Digital Video Disc Read Only Memory
EPROM—Erasable Programmable Read Only Memory
FLASH-EPROM—Flash Erasable Programmable Read Only Memory
HLR—Home Location Register
IM—Instant Messaging
MSC—Mobile Station Controller
MPC—Mobile Positioning Center
PROM—Programmable Read Only Memory
PSAP—Public Safety Answering Point
PSAP DB—Public Safety Answering Point Service Area & Capabilities Database
RAM—Random Access Memory
ROM—Read Only Memory
SMS—Short Message Service
SMSC—Short Message Service Center
TTY—Teletype

The invention claimed is:

1. An emergency message handling system, comprising:
an emergency handling platform including a processor; and
a database of information regarding service areas of Public Safety Answering Points (PSAPs), accessible to the emergency handling platform;
wherein the emergency handling platform processor is configured to implement:
(a) a short message service (SMS) gateway server configured to receive emergency SMS text messages via a mobile communication network;
(b) an SMS application server configured to respond to each of the emergency SMS text messages received at the SMS gateway server from a respective mobile station to determine a location of the respective mobile station, and access the database of information to determine one of the APs assigned to cover the location of the respective mobile station and to determine whether the one PSAP is a teletype (TTY) system or an Internet Protocol (IP) network system; and
(c) an SMS-To-TTY message converter,
wherein the emergency handling platform processor is configured to convert a first SMS message to a TTY message upon determining that the one PSAP assigned to a mobile station from which the first SMS message originated is a TTY system, using the SMS-To-TTY message converter, and deliver the TTY message to the TTY system, and deliver a second SMS message directly to the IP network system PSAP without TTY conversion upon determining that the one PSAP assigned to a mobile station from which the second SMS message originated is an IP network system.

2. The emergency message handling system of claim 1, wherein the emergency message handling system further comprises a TTY selective router configured to deliver the first SMS text message in TTY format to the TTY messaging system of the TTY PSAP system.

3. The emergency message handling system of claim 1, wherein the SMS gateway server is configured to receive the emergency SMS text messages from a short message peer to peer (SMPP) gateway server of the mobile communication network.

4. The emergency message handling system of claim 3, wherein the SMPP gateway server is configured to receive the emergency SMS text messages from a short message service center (SMSC) of the mobile communication network.

5. The emergency message handling system of claim 1, wherein the emergency handling platform is configured to:
request and obtain the location of the respective mobile station from a location platform server (LPS) of the mobile communication network; and
deliver the information to the respective PSAP assigned.

6. The emergency message handling system of claim 5, wherein:
the PSAP has an automatic location identification (ALI) system; and
the emergency handling platform is further configured to cause respective location information to be sent to the ALI system of the respective PSAP for the delivered message.

7. The emergency message handling system of claim 2, wherein:
the selective router of the emergency handling platform is configured to receive the emergency message from the TTY PSAP systems;
the SMS to TTY message converter is further configured to convert the TTY emergency message from the TTY PSAP systems into an SMS text message; and
the emergency handling platform is further configured to deliver the converted emergency message from the TTY PSAP to the SMPP gateway server to the respective mobile station through the mobile communication network.

8. The emergency message handling system of claim 7, wherein the emergency handling platform is configured to send an error message to the mobile station when the location of the mobile station cannot be determined by a location platform server (LPS).

9. A method, comprising steps of:
receiving, through a mobile communication network including a processor configured to implement a short message service (SMS) gateway server, text messages from respective mobile stations addressed to an emergency call service number to initiate an emergency service communication session;
responsive to each of the text messages received at the SMS gateway server, obtaining, by the processor, information identifying a current location of the respective mobile station;
based on the identified current location the respective mobile station:
determining, by the processor, one of a number of public safety answer points (PSAPs) assigned to cover the identified current location of the respective mobile station; and
determining, by the processor, whether the one PSAP is a teletype (TTY) system or an Internet Protocol (IP) communication capable system;
for a first emergency service communication session of a first of the mobile stations determined to be handled by the one PSAP when the one PSAP has IP communication capability, communicating, by the processor, the text message between the first mobile station and the IP capable PSAP;
for a second emergency service communication session of a second of the mobile stations determined to be handled by the one PSAP when the one PSAP does not have IP communication capability, translating, by the processor, the text message received from the second mobile station into a TTY format message;

providing, by the processor, the TTY format message and the information identifying the current location of the second mobile station to the non-IP capable PSAP; and communicating, by the processor, the text message between the first mobile station and the non-IP capable PSAP, including providing for conversion of text the message from the second mobile station into TTY format and for conversion of TTY format message from the non-IP capable PSAP into text message format.

10. The method of claim 9, further comprising:
delivering the text message from the mobile station to the IP network system PSAP without TTY conversion upon determining that the PSAP assigned to the respective mobile station is IP capable; and
converting the text message to a TTY format message from the mobile station and delivering the TTY format message to the TTY PSAP upon determining that the PSAP assigned to the respective mobile station is not IP capable but is TTY capable.

11. The method of claim 10, further comprising:
converting the TTY message from the TTY PSAP into a text message and delivering the text message to the respective mobile station that initiated the text message to the emergency call service number upon determining that the PSAP assigned to a respective mobile station is not IP capable but is TTY capable.

12. The method of claim 9, wherein the identifying the current location of the respective mobile station comprises determining the location of a base station that receives the respective text message.

13. The method of claim 9, wherein the identifying the current location of the respective mobile station comprises communicating with the respective mobile station and obtaining a GPS location from the mobile station's GPS receiver.

14. The method of claim 9, wherein the identifying the current location of the respective mobile station comprises triangulating between three closest base stations to the respective mobile station.

15. The method of claim 9, further comprising:
receiving a request for the location of the respective mobile station from the TTY PSAP upon determining that the PSAP assigned to the respective mobile station is not IP capable but is TTY capable.

16. The method of claim 9, further comprising:
sending an error message to the mobile station while communication with a PSAP is established, upon determining that the location of the mobile station cannot be sufficiently determined.

17. The method of claim 9, further comprising:
sending an error message to the mobile station that upon determining that the mobile station is out service range of an emergency call service area.

18. A method comprising the steps of:
receiving an emergency text message addressed to an emergency call service number, wherein the emergency text message is received by a short message service (SMS) gateway server of the emergency handling platform that includes a processor;
sending an acknowledgment by the processor to a short message peer to peer (SMPP) gateway server of a wireless network;
requesting a location of a mobile station of the received emergency text message by the processor of the emergency handling platform, from a location platform server (LPS) of the mobile communication network;
receiving the location of the mobile station by the processor;
requesting, by the processor, a Public Safety Answering Point Service Area & Capabilities Database/Mobile Positioning Center (PSAP DB/MPC) to determine one of a plurality of Public Safety Answering Points (PSAPs) assigned to cover the location of the mobile station and identify whether the one PSAP assigned to the mobile station is a teletype (TTY) system or an Internet Protocol (IP) communication capable system;
receiving, by the processor, the determination of the one PSAP assigned and the respective system of the one PSAP assigned; and
when the identified one PSAP has IP communication capability communicating one or more text messages between the mobile station and the IP capable PSAP; and
when the identified one PSAP does not have IP communication capability but has TTY capability, converting, by the processor, the text message received from the mobile station into a TTY format message, providing, by the processor, the location of the mobile station to the identified one PSAP not having IP communication capability by the PSAP DB/MPC, and providing, by the processor, text communication between the identified one PSAP not having IP communication capability and the mobile station; wherein each text message from the mobile station is converted into TTY format and each TTY message from the identified one PSAP not having IP communication capability is converted to text by the emergency handling platform.

\* \* \* \* \*